Nov. 28, 1967  C. M. CERVIN  3,355,015
CONTROL APPARATUS FOR GRADING OBJECTS
Filed April 23, 1965  2 Sheets-Sheet 1

INVENTOR.
CURTIS M. CERVIN
BY *J. Gordon Reed*
ATTORNEY

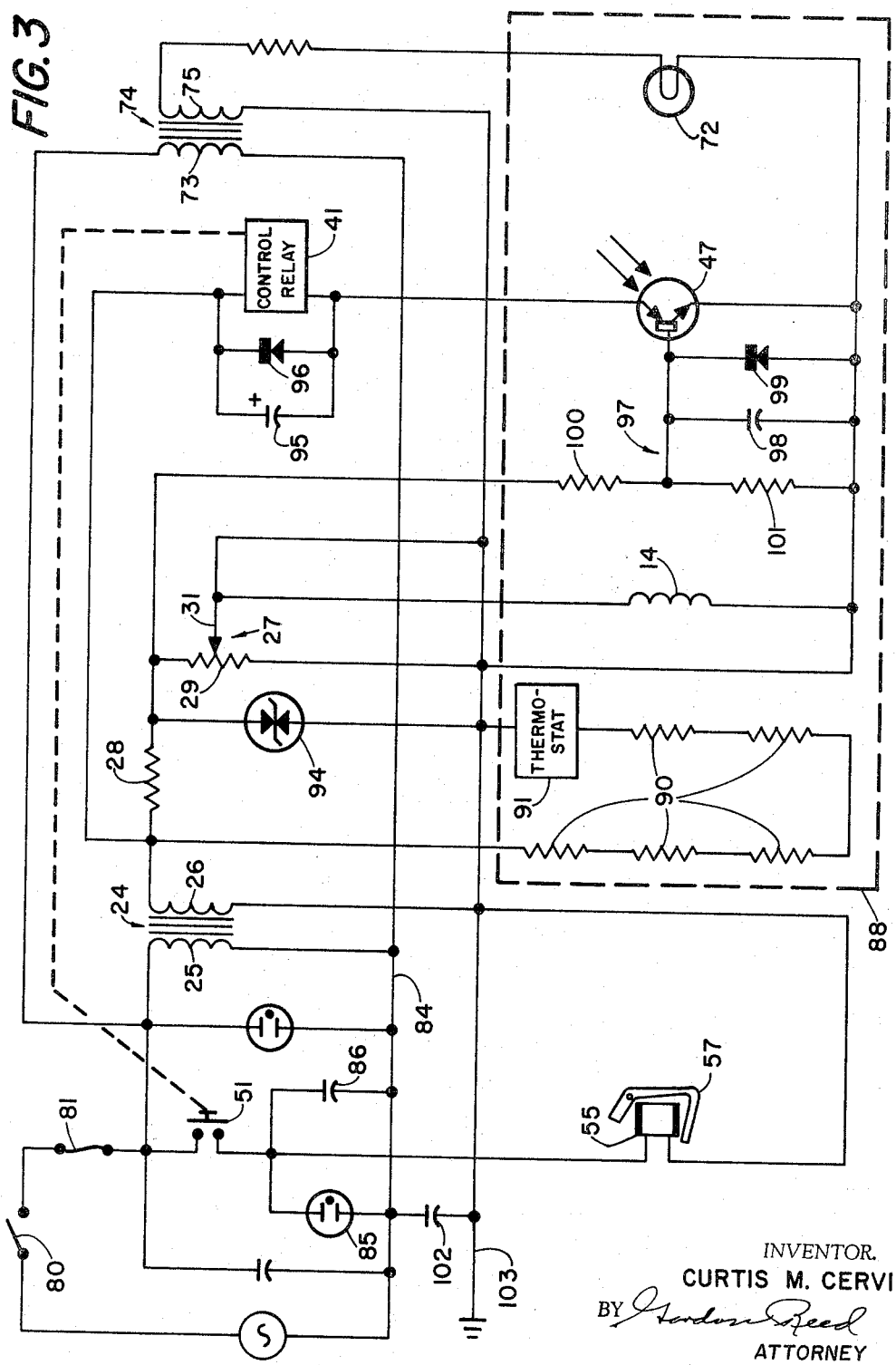

United States Patent Office 3,355,015
Patented Nov. 28, 1967

3,355,015
CONTROL APPARATUS FOR GRADING OBJECTS
Curtis M. Cervin, 5004 Xerxes Ave. S.,
Minneapolis, Minn. 55410
Filed Apr. 23, 1965, Ser. No. 450,381
13 Claims. (Cl. 209—73)

This invention relates to apparatus for grading or separating objects by weight. Apparatus for grading objects by weight have been heretofore provided.

In one prior art apparatus for grading objects by weight, an endless conveyor which could be driven at various speeds moved or propelled the objects to be graded over a supporting surface for the objects. At intervals sequentially arranged with respect to the motion of the endless conveyor and objects, stations were provided at which objects were graded progressively during their movement in accordance with their weight. The particular machine concerned was adapted to grade eggs by weight. The eggs were rolled over the supporting surface and were consequently supplied to the conveyor in an attitude crosswise of the conveyor.

Each of the above stations was provided with a weight-detecting apparatus which energized an electric solenoid when the objects exceeded a predetermined weight. The energization of the solenoid even momentarily, operated a pivotal arm which was mechanically retained in its operated position.

The conveyor included a number of laterally extending arms which pushed or rolled the objects along the sensing path as represented by the stations. Each laterally extending arm of the conveyor was effective to propel an object. Associated with each lateral arm was a movable object-ejecting arm. When the object-ejecting arm as it travelled with the conveyor reached the pivotal, solenoid operated arm, a camming action occurred causing the object-ejecting arm to move into object ejecting position.

Shortly thereafter, a portion of the conveyor served to reset the pivotal solenoid operated arm. The object-ejecting arms were also subsequently reset to unoperated position.

An object of this invention is to provide an improved object weight sensing apparatus associated with an endless conveyor which will speed up the grading of objects such as eggs.

A further object of this invention is to provide an improved grading apparatus, by weight, with novel selective means for varying the standard or class weight with respect to which an object is to be graded.

A further object of this invention is to provide in a grading apparatus an arrangement whereby the object sensing operation and the object ejecting operation are sequentially effected.

A further object of this invention is to provide a grading arrangement wherein the sensing mechanism is not adversely affected by operation of the rejecting arrangement.

Other objects and advantages of the arrangement will become evident from a consideration of the following description taken with the accompanying drawings wherein:

FIGURE 3 is an electrical schematic of the object sensing apparatus and a portion of the object ejecting apparatus associated therewith.

Figure 1:
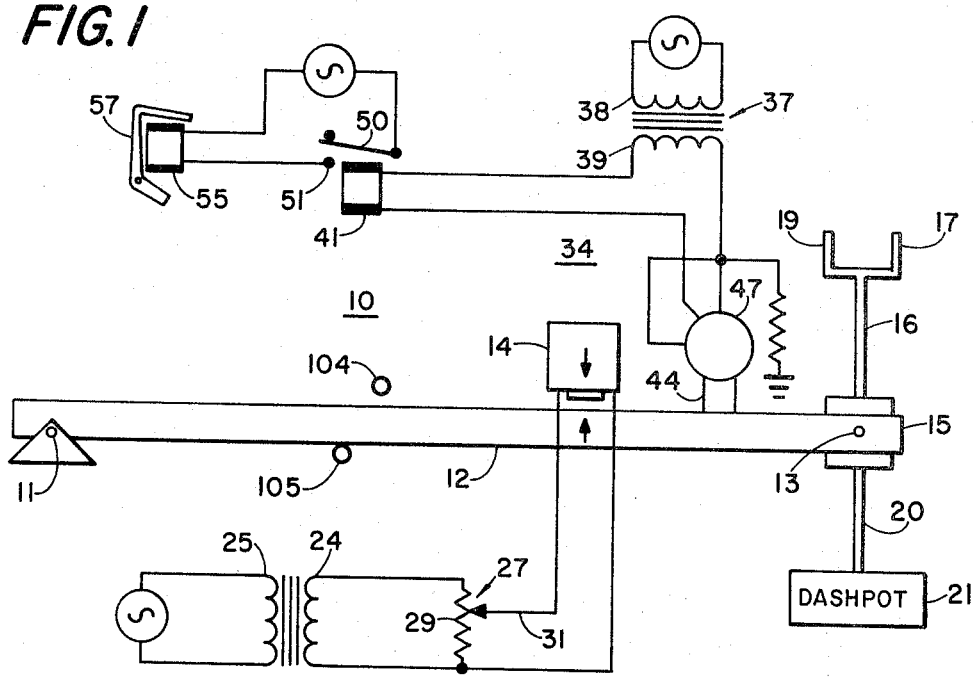
FIGURE 1 is a schematic diagram of the object grading apparatus.

Referring to FIGURE 1, an object weight sensing or weight responsive device 10 comprises a moveable balance beam 12 pivoted for example at one point along its length such as at one end by a fulcrum 11. The beam is balanced or biased in an upwardly direction or position by means applying a magnetic force thereto as by a solenoid 14 exerting a magnetic force on a metallic portion of the beam. The opposite end 15 of the beam by means of a pivot arrangement 13 supports an upstanding rod 16 which in turn has object supporting rails 17, 19 affixed thereto. The lower side of the beam in the figure has a depending rod 20 which engages a dashpot 21 for beam movement damping purposes. Suitable stops 104, 105 limit angular displacement of beam 12.

The selectively variable alternating current energization of solenoid 14 is provided by a transformer 24 having its primary winding 25 connected to an alternating current source. A secondary winding 26 of the transformer has a voltage divider 27 comprising a resistor 29 connected across it. The voltage divider includes an adjustable slider 31 engaged with the resistor 29 so that the current through solenoid 14 may be varied, to set up a standard, and in accordance therewith the weight of the object will determine if it is to be rejected.

Associated with the beam 12 is a beam movement sensing arrangement 34. This arrangement includes a transformer 37 having a primary winding 38 connected to a 110 volt AC supply and a secondary winding 39. The arrangement includes a load device in the form of a relay 41. The current through the load device is controlled by pivotal movement of the weighing beam 12. A shutter 44 fastened to beam 12 normally obstructs the passage of radiant energy as light from an incandescent lamp, to a light activated silicon controlled rectifier 47. Upon movement of the beam in the downward direction as the result of a heavy object on rails 17, 19 in FIGURE 1, shutter 44 is moved from the light obstructing position. Consequently the light falling on the light activated silicon controlled rectifier causes it to become conductive and completes a circuit from the transformer secondary winding 39, through relay 41, through the rectifier 47 and returns to the opposite side of the secondary winding 39.

Energization of relay 41 causes arm 50 thereof to engage a contact 51 to complete a normally open circuit from a 120 volt supply to a solenoid 55. The energization of solenoid 55 effects movement of pivotal arm 57 of the prior art device previously mentioned into effective camming position.

Figure 2:
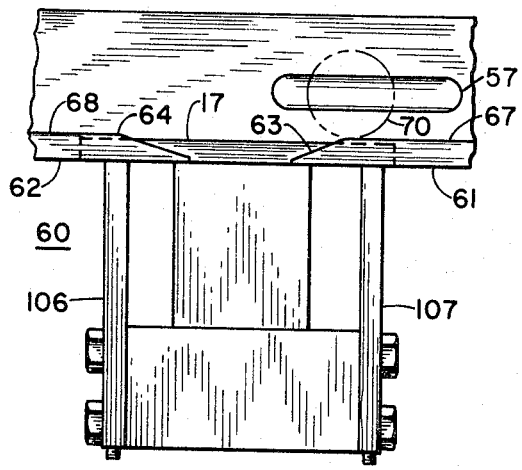
FIGURE 2 shows a portion of the object weight sensing apparatus in physical relation to the object supporting portion of the conveyor.

The conveyor supporting frame 60 in FIGURE 2 has ramp members 61, 62 at the weighing station which constitute a continuation of the object supporting member of the conveyor. The ramp members are supported by vertically adjustable members 106, 107. The ramp members are configured so as to receive the opposed egg supporting lateral side rails 17, 19 of FIGURE 1 that are supported on beam 12. The relative vertical position of the top of ramps 61, 62 is such that the top portion 67 of the first ramp member 61 nearest a conveyed approaching object is slightly above the top edge of rails 17, 19. However, assuming the conveyor is moved from right to left in FIGURE 2 the object 70 such as an egg as it is propelled by the conveyor moves from the top edge 67 of ramp member 61 onto the ramp portion 63 thereof. Further leftward movement gently and without vertical impact on rails 17, 19 places the object 70 into supporting position in a vertical direction on rails 17, 19. Such placement of the objects on the rails insures that only the object weight affects movement of beam 12 vertically.

If the object 70 is of such weight that it is to be ejected because of tilting of beam 12 at the sensing station, the ejection will not occur until the conveyor has moved object 70 along the ramp portion 64 of second ramp member 62 so that the ejecting operation occurs when rails 17, 19 do not support the weight of object 70.

In the electrical schematic, FIGURE 3, transformer 24 has its primary winding 25 connected to the alternating current supply. The secondary winding 26 has the resistor 28 and resistor 29 of voltage divider 27 connected across its ends. Slider 31 of the voltage divider 27 is connected to one end of the beam biasing solenoid 14 having its opposite end connected to ground which is common to the opposite end of resistor 29 thus with resistor 29 energized by alternating current, the force repeatability of solenoid 14 for the same position of slider 31 is assured. A transformer 74 has its primary winding 73 also connected to the AC supply and its secondary winding 75 connected in energizing relation to an incandescent lamp 72. Lamp or radiant energy source 72 serves to energize the light activated silicon controlled rectifier 47 upon removal of shutter 44 FIGURE 1 from light obstructing relation. The activation or operation of rectifier 47 completes a circuit through relay 41. Operation of relay 41 closes its normally open contact 51 thereby completing a circuit through operating solenoid 55 which operates its related pivotal arm 57.

The conveyor speed may be adjusted to obtain a maximum grading of the objects in a unit of time.

While only one weighing station has been shown it is to be understood that several stations may be placed in series along the conveyor. Each station would eject an object of a different weight from that ejected by the other stations. The selection of the weight of an object to be ejected is made by the adjustment of slider 31 which varies the current through beam biasing solenoid 14.

FIGURE 3 includes a main turn on switch 80 and a fuse 81 for connecting one side of primary winding 25 to a source of AC voltage; the opposite side of the primary winding being connected through conductor 84 to return. Connected across the primary winding 25 through a pair of normally open relay contacts 51 is an operation indicator tube 85 such as a neon bulb, and in parallel therewith is a by-pass condenser 86. While the normally open relay contacts 51 are closed, energizing the load coil 55, the duration of its energization resulting from activation of the light sensitive transducer 47 is evidenced by the indicator 85.

For thermostatic control of the sensing apparatus comprising transducer 47, and lamp 72 enclosed in a casing 83 there is provided a heating arrangement comprising resistors 90 connected across the secondary winding 26 and controlled by a thermostat 91 in series with the resistors.

A voltage regulator such as a Zener diode 94 regulates the voltage or current applied to winding 14.

Associated with relay 41 is a capacitor 95 in parallel therewith for preventing chattering of the relay. A diode 96 also in parallel with relay 41 prevents the application of a peak inverse voltage to rectifier 47 by providing a conductive path about relay 41.

Rectifier or transducer 47 is provided with a biasing arrangement 97 which includes a filter condenser 98, diode 99, resistor 100, 101. Completing FIGURE 3 is a by-pass condenser 102 between neutral conductor 84 and grounded conductor 103.

From the above, it will now be evident that in a prior art device wherein a conveyor served to move individual articles over a surface that vertically supported the articles during such movement, that a section of the surface extending in the direction in which the articles are moved had been removed. In its place there is inserted the present improved weight sensing or grading device. This device comprises ramp members, one at each end, to form a continuation of the object supporting surface, and supporting rails. The rails are intermediate the ramp members and support the conveyed objects sequentially during a weighing operation. When an object while on the first ramp member reaches the ramp portion, it rolls ahead of its pusher onto the rails at which moment its weight is sensed. If its weight be greater than the predetermined weight selected by slider 31, it will be laterally ejected but only after the pusher has moved the article onto the second ramp member and off the object supporting rails, thereby avoiding lateral force on the rails 17, 19 during lateral ejection.

*Operation*

As the conveyor moves or rolls objects along the fixed member, which gives vertical support to the objects, and thence to rails 17, 19, if the object exceeds the force effect on beam 12 exerted by solenoid 14, the beam 12 will pivot or rotate clockwise in FIGURE 1, removing shutter 44 from light obstructing position, permitting light source 72 to activate rectifier 47. This activation completes a circuit through operating means of relay 41 closing relay contact 51 and completing a circuit through the load solenoid 55. Solenoid 55 positions pivotal arm 57. The arm 57 remains as positioned by only momentary energization of solenoid 55 or for a half cycle of the voltage across secondary 26 and thus despite movement of the object during continuous operation of the conveyor by rolling action from rails 17, 19 of the weight sensing apparatus to ramp 64. With the object on ramp 64, in the prior art conveyor, a camming action occurs between the solenoid operated pivotal arm 57 and the conveyor ejector arm for ejecting the object from the conveyor laterally.

By means of the alternating current energized voltage divider 29 and selectively operable slider 31, the energization of solenoid 14 may be varied. The slider may be moved in one direction to increase or in an opposite direction to decrease the energization of solenoid 14 and thus the bias force on beam 12. By this selective energization, the weight of the object such as an egg that will be ejected, upon operation of beam 12 may be varied.

The provision of an AC energized voltage divider permits the same adjustment point of the slider 31 on voltage divider resistor 29 upon return thereto if displaced to effect the same weight control or force repeatability on beam 12. There is no hysteresis effect. In other words the same and repeated slider adjustment causes solenoid 14 to exert the same bias effect on metallic beam 12. Also it will be now evident that at low conveyor speed movement of the objects accompanied by beam movement, indicator light 85 will be on a long time, in fact longer than necessary to energize load device 41. The speed of movement may be increased. By noting the period that indicator 85 is on, the operator can better judge when the speed of an object is at the maximum while still giving sufficient time to energize load 41. Thus there is a relationship between object speed or conveyor speed and beam bias in that for rejecting objects of a given weight, if the conveyor speed be increased the beam bias should be decreased and vice versa.

What is claimed is:

1. In a weighing and rejecting apparatus, primary ramp means for supporting eggs for rolling motion along a path, a pair of egg supporting rails longitudinally extending in the direction of motion of the eggs having a first portion vertically below the surface of the ramp means at one point in the path and a second portion vertically above the surface of the ramp means at a subsequent point in the path so that the egg in its motion gradually moves from the ramp means and becomes supported by said rails, a pivoted beam mounting for said rails and biased to a normal position but angularly moved therefrom when the weight of the egg on the rails exceeds the applied bias, sensing means operated by the pivoted beam upon angular motion thereof, and load means controlled by said sensing means.

2. The apparatus of claim 1, and secondary ramp means for elevating the egg above the rails.

3. The apparatus of claim 1, wherein the biasing means is provided by a magnetic coil means.

4. The apparatus of claim 3, wherein the coil is energized from a source of selectively variable alternating current.

5. The method of sorting articles capable of a rolling action comprising the steps of placing the articles on a horizontal support, pushing the articles in seriatum by means of a separate member for each article, permitting a gravity force to alter the velocity of each article in the sequence to thereby advance each article with respect to its pushing member, sensing a physical property of an article while in advance of its pushing member, and laterally ejecting an article while its property is being sensed if it be different from a predetermined magnitude.

6. In an object weighing and sorting apparatus, first means for supporting objects during rectilinear motion thereof; second means movably mounted and solely supporting the objects during a portion of the rectilinear motion, said second means comprising a member biased by magnetic means to a normal position, for receiving said objects; a source of radiant energy; a radiant energy activated current conducting device exposed to the radiant energy upon movement of the member away from its biased position; a load device and an indicating device energized upon conduction of said current conducting device, the duration of energization of said indicating device serving as a guide for altering the time period of support by the first means of said objects.

7. The apparatus of claim 6, wherein the radiant energy activated device is a semiconductor.

8. The apparatus of claim 6, wherein the biasing means includes an alternating current energized winding for providing a magnetic field operating on the moveable member.

9. In an article weighing and ejecting apparatus comprising a conveyor including means vertically supporting articles during movement thereof by the conveyor, an article weighing device comprising a source of light, a light activated silicon controlled rectifier, an article receiving moveable member normally interrupting passage of light from said source to said silicon controlled rectifier, circuit means including said silicon control rectifier energized on movement of said member away from the light passage interception position for controlling ejection of the article from the conveyor, and further means for pre-determining the weight of the article that will cause movement of the member, wherein the light source, the circuit means, and the further means are energized from a common A.C. source.

10. The apparatus of claim 9, with a dashpot connected to the member for damping motion thereof.

11. In a weighing apparatus comprising a main beam supported in rocking relation on a frame and in turn relatively rockably supporting thereon an object carrying receptacle, magnetic means for biasing said main beam to a normal position, and means energized upon displacement of the main beam from normal biased position for ejecting the object from the receptacle.

12. The apparatus of claim 11, wherein the receptacle includes a member operating a plunger of a dashpot to act as a guiding means for the object carrying receptacle during its movement.

13. The apparatus of claim 11, wherein the magnetic means comprises an adjustable means for varying the torque applied to the beam by the magnetic means.

References Cited

UNITED STATES PATENTS

| | | | |
|---|---|---|---|
| 2,007,039 | 7/1935 | Meharg | 209—121 |
| 2,104,546 | 1/1938 | Pennell et al. | 209—121 |
| 2,158,023 | 5/1939 | Smith | 209—121 |
| 2,661,201 | 12/1953 | Bowes. | |
| 2,702,120 | 2/1955 | Nordquist | 209—121 |
| 2,731,146 | 1/1956 | Page | 209—121 |
| 2,759,603 | 8/1956 | Bradley | 209—121 |
| 2,781,127 | 2/1957 | Becker | 209—115 |
| 2,818,888 | 1/1958 | Atwood et al. | 209—121 X |
| 3,152,655 | 10/1964 | Allen et al. | 209—121 X |

M. HENSON WOOD, JR., *Primary Examiner.*

ALLEN N. KNOWLES, *Examiner.*